United States Patent
Bai et al.

(10) Patent No.: US 8,797,686 B1
(45) Date of Patent: Aug. 5, 2014

(54) MAGNETIC RECORDING TRANSDUCER WITH SHORT EFFECTIVE THROAT HEIGHT AND METHOD OF FABRICATION

(75) Inventors: Zhigang Bai, Milpitas, CA (US); Peng Luo, San Ramon, CA (US); Shaoping Li, San Ramon, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 12/978,242

(22) Filed: Dec. 23, 2010

(51) Int. Cl.
  *G11B 5/31* (2006.01)
  *G11B 5/23* (2006.01)
(52) U.S. Cl.
  USPC ............ 360/125.15; 360/119.03; 360/119.04
(58) Field of Classification Search
  CPC .... G11B 5/187; G11B 5/1871; G11B 5/1872; G11B 5/23; G11B 5/232; G11B 5/3116
  USPC ............ 360/125.11, 125.15, 125.21, 125.48, 360/125.53, 119.02, 119.03, 119.04, 119.07
  See application file for complete search history.

(56) References Cited

U.S. PATENT DOCUMENTS

| | | |
|---|---|---|
| 6,456,465 B1 | 9/2002 | Louis et al. |
| 6,724,572 B1 | 4/2004 | Stoev et al. |
| 6,791,793 B1 | 9/2004 | Chen et al. |
| 6,906,894 B2 | 6/2005 | Chen et al. |
| 7,070,698 B2 | 7/2006 | Le |
| 7,199,973 B2 | 4/2007 | Lille |
| 7,212,379 B2 | 5/2007 | Hsu et al. |
| 7,212,380 B2 * | 5/2007 | Hsiao et al. ............... 360/125.12 |
| 7,271,982 B2 | 9/2007 | MacDonald et al. |
| 7,296,337 B2 | 11/2007 | McFadyen |
| 7,343,667 B2 | 3/2008 | Lille |
| 7,377,024 B2 | 5/2008 | Chen |
| 7,417,824 B2 * | 8/2008 | Kameda ................... 360/125.02 |
| 7,440,230 B2 | 10/2008 | Hsu et al. |
| 7,446,980 B2 | 11/2008 | Le |
| 7,468,862 B2 * | 12/2008 | Sasaki et al. ............. 360/125.02 |
| 7,506,431 B2 | 3/2009 | Hsiao et al. |
| 7,522,379 B1 | 4/2009 | Krounbi et al. |
| 7,532,432 B2 | 5/2009 | Ikeda et al. |
| 7,558,019 B2 | 7/2009 | Le et al. |
| 7,562,437 B2 | 7/2009 | Pentek et al. |
| 7,576,951 B2 | 8/2009 | Allen et al. |
| 7,633,713 B2 | 12/2009 | Chen et al. |
| 7,712,206 B2 | 5/2010 | Jiang et al. |
| 7,748,104 B2 | 7/2010 | Bonhote et al. |
| 7,757,380 B2 | 7/2010 | Baer et al. |
| 7,768,743 B2 | 8/2010 | Guthrie et al. |
| 7,770,281 B2 | 8/2010 | Pentek |
| 7,777,988 B2 | 8/2010 | Guan et al. |
| 7,788,797 B2 | 9/2010 | Kim et al. |

(Continued)

*Primary Examiner* — Craig A. Renner

(57) ABSTRACT

A magnetic recording transducer for use in a data storage device includes a writer pole with a ABS surface, trailing edge bevel and a trailing shield. The effective throat height of the writer main pole is reduced by the use two gap layers between the writer main pole and the trailing shield. A first gap layer is on and in contact with the writer pole trailing surface, and a second gap layer is on a section of the first gap layer on the writer pole trailing edge bevel, from a point removed from the ABS surface and absent from a part on a section of the first gap layer on the writer pole trailing edge bevel nearest the ABS. A method of fabricating the transducer is also provided.

14 Claims, 9 Drawing Sheets

(56) References Cited

U.S. PATENT DOCUMENTS

| | | |
|---|---|---|
| 7,793,406 B2 | 9/2010 | Zheng |
| 7,804,666 B2 | 9/2010 | Guan et al. |
| 8,248,728 B2 * | 8/2012 | Yamaguchi et al. ..... 360/125.09 |
| 8,264,792 B2 | 9/2012 | Bai et al. |
| 8,375,564 B1 | 2/2013 | Luo et al. |
| 8,444,866 B1 | 5/2013 | Guan et al. |
| 8,470,186 B2 * | 6/2013 | Chen et al. ............... 360/125.03 |
| 2002/0034043 A1 * | 3/2002 | Okada et al. .................. 360/125 |
| 2005/0219747 A1 * | 10/2005 | Hsu et al. ....................... 360/126 |
| 2006/0268456 A1 | 11/2006 | Sasaki et al. |
| 2007/0230046 A1 | 10/2007 | Le et al. |
| 2007/0236831 A1 | 10/2007 | Che et al. |
| 2008/0002292 A1 | 1/2008 | Le et al. |
| 2008/0112082 A1 | 5/2008 | Guan et al. |
| 2008/0198507 A1 | 8/2008 | Maruyama et al. |
| 2008/0225441 A1 | 9/2008 | Yamada et al. |
| 2008/0259498 A1 | 10/2008 | Lengsfield et al. |
| 2008/0278861 A1 | 11/2008 | Jiang et al. |
| 2009/0021863 A1 | 1/2009 | Zheng |
| 2009/0103211 A1 | 4/2009 | Chen et al. |
| 2009/0116145 A1 | 5/2009 | Guan et al. |
| 2009/0147410 A1 | 6/2009 | Jiang et al. |
| 2009/0154012 A1 | 6/2009 | Mochizuki et al. |
| 2009/0154019 A1 | 6/2009 | Hsiao et al. |
| 2009/0268344 A1 * | 10/2009 | Guan et al. ............... 360/119.02 |
| 2010/0061016 A1 | 3/2010 | Han et al. |
| 2010/0165517 A1 | 7/2010 | Araki et al. |
| 2010/0172054 A1 | 7/2010 | Yamaguchi et al. |
| 2010/0277832 A1 * | 11/2010 | Bai et al. .................. 360/125.03 |
| 2011/0134569 A1 | 6/2011 | Allen et al. |
| 2011/0151279 A1 | 6/2011 | Allen et al. |
| 2012/0044598 A1 * | 2/2012 | Bai et al. .................. 360/123.12 |
| 2012/0087042 A1 | 4/2012 | Zhou et al. |
| 2012/0314324 A1 | 12/2012 | Guan |

* cited by examiner

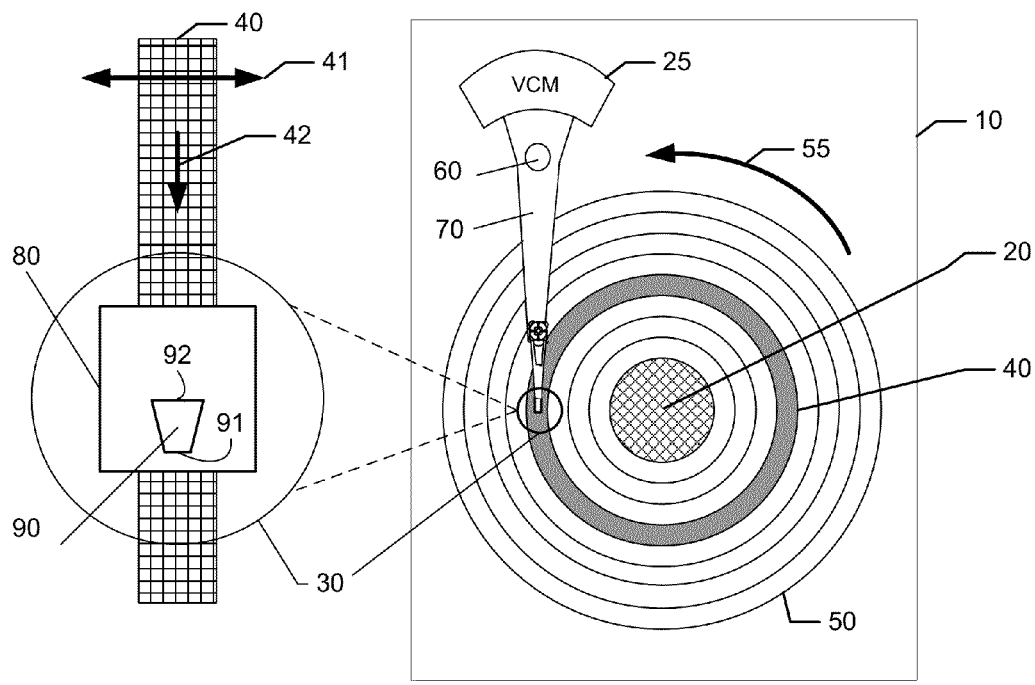
FIG. 1a
(Prior Art)
FIG. 1
(Prior Art)
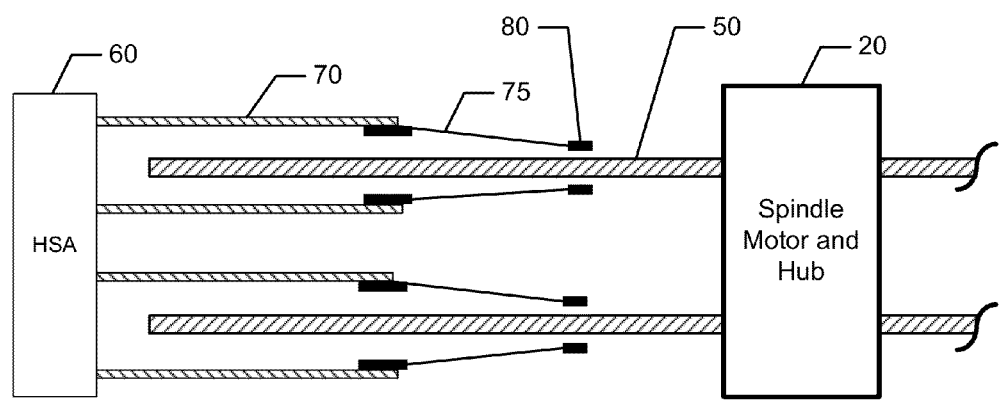
FIG. 1b
(Prior Art)

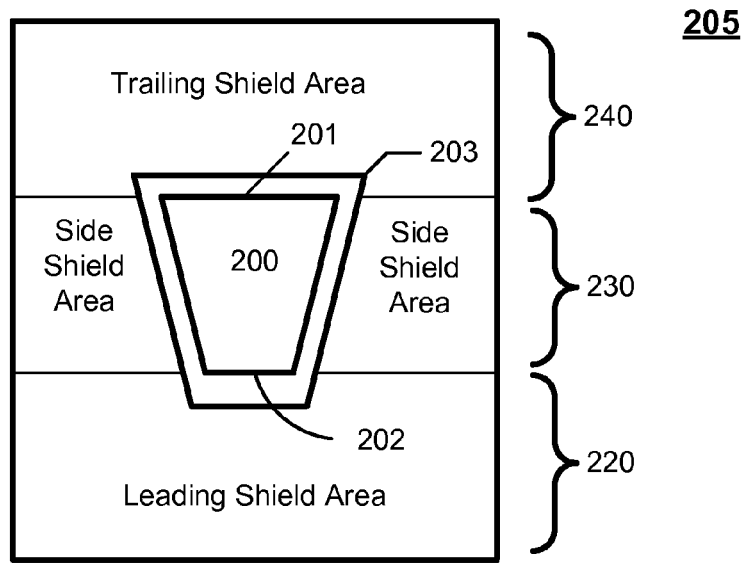
FIG. 2
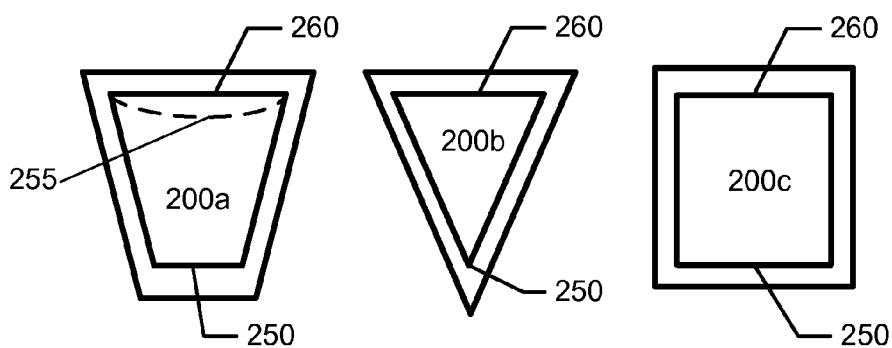
FIG. 2a  FIG. 2b  FIG. 2c

MAGNETIC RECORDING TRANSDUCER WITH SHORT EFFECTIVE THROAT HEIGHT AND METHOD OF FABRICATION

BACKGROUND

FIG. 1 illustrates a conventional disk drive 10 used for data storage. FIGS. 1, 1a, and 1b are not drawn to scale and only certain structures are depicted for clarity. Disk media 50 is attached to spindle motor and hub 20. The spindle motor and hub 20 rotate the media 50 in a direction shown by arrow 55. Head Stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1a illustrates an enlarged view of area 30 of FIG. 1. A magnetic recording transducer 90 is fabricated on slider 80. Slider 80 may be attached to suspension 75 and suspension 75 may be attached to actuator arm 70 as shown in FIG. 1b.

Referring again to FIG. 1a, Slider 80 is illustrated above recording track 40. Media 50 and track 40 are moving under slider 80 in an in-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in direction 42.

FIG. 1b illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

BRIEF SUMMARY

A magnetic recording transducer for use in a data storage device includes a writer pole with a ABS surface, trailing edge bevel and a trailing shield. The effective throat height of the writer main pole is reduced by the use two gap layers between the writer main pole and the trailing shield. A first gap layer is on and in contact with the writer pole trailing surface, and a second gap layer is on a section of the first gap layer on the writer pole trailing edge bevel, from a point removed from the ABS surface and absent from a part on a section of the first gap layer on the writer pole trailing edge bevel nearest the ABS. A method of fabricating the transducer is also provided.

BRIEF DESCRIPTION OF THE DRAWINGS

FIG. 1 illustrates a conventional disk drive in a top view.

FIG. 1a illustrates a more detailed view of an area shown in FIG. 1.

FIG. 1b illustrates side view of the disk drive shown in FIG. 1.

FIG. 2 illustrates an ABS view of a writer portion of a transducer with shield areas.

FIG. 2a-c illustrate writer transducer geometry alternatives.

DETAILED DESCRIPTION OF THE EMBODIMENTS

Figure 3:
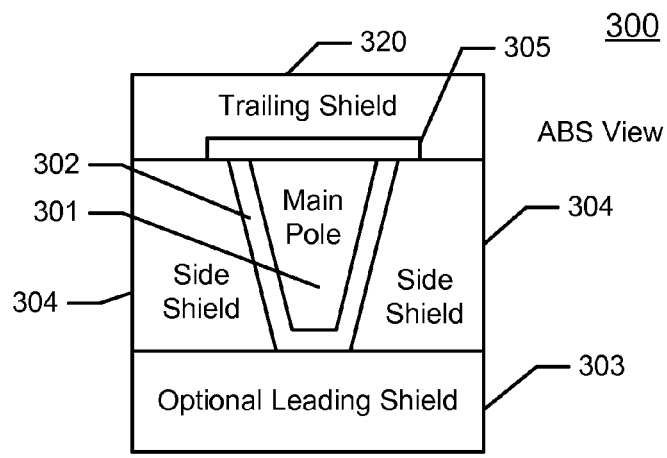
FIG. 3 illustrates an ABS view of a writer transducer and shields.

FIG. 2 illustrates an ABS view of magnetic recording transducer 205. The ABS view is the view looking at the ABS from the viewpoint of the media surface. Main pole 200 of magnetic recording transducer 205 is separated from surrounding structures by nonmagnetic gap 203. Main pole 200 has leading edge 202 on the leading side of main pole 200 and a trailing edge 201 on the trailing side of main pole 200. Recording transducer 205 has side shield areas 230 on the sides of main pole 200 between leading shield area 220 and trailing shield area 240. Embodiments of the invention may include magnetic shields in any or all of the side shield areas 230, the leading shield area 220, and/or the trailing shield area 240.

The trapezoidal pole shape 200 shown in FIG. 2 is conventional in perpendicular magnetic recording (PMR); however, other shapes may also be used. FIG. 2a illustrates a trapezoidal shape 200a with optional curved trailing edge 255. FIG. 2b illustrates a pole 200b with triangular shape, and FIG. 2c illustrates a pole 200c with rectangular shape. In FIGS. 2a-c, pole edges illustrated with straight lines may also be implemented as curved or faceted. In FIGS. 2a-c, main pole 200a-c have a leading edge 250, and a trailing edge 260. Those of skill in the art will recognize that these shapes, combinations or variations of these shapes, and other shapes may be used without departing from the spirit of the invention.

FIG. 3 illustrates an embodiment of a portion of PMR transducer 300 shown in view from the ABS. Main pole 301 is depicted as a PMR trapezoidal pole with an optional leading shield 303, nonmagnetic gap material 302, side shields 304, write gap 305, and trailing shield 320.

Figure 4:
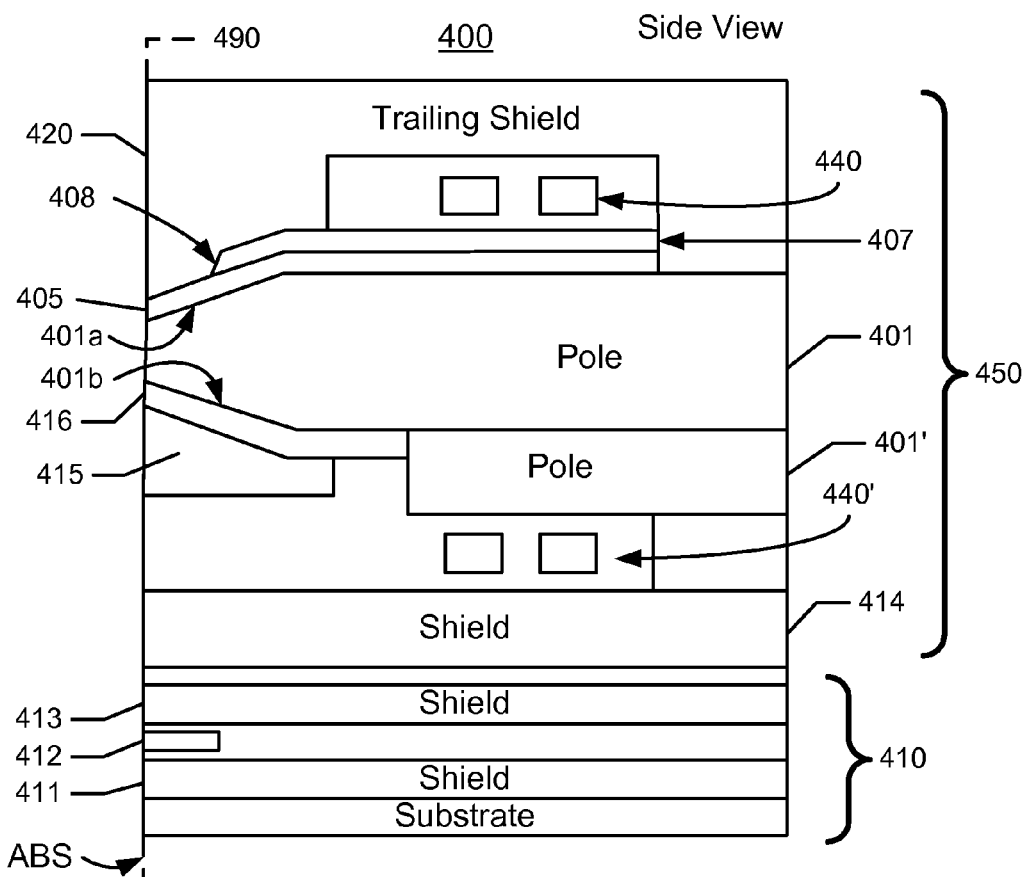
FIG. 4 illustrates an embodiment of the invention in side view.

FIG. 4 illustrates an embodiment of the invention in a side view of read/write head 400 incorporating a write transducer 450 and read sensor 410. For clarity, figures are not to scale. FIG. 3 depicts an ABS view of PMR transducer 300 only, while FIG. 4 depicts a side view of read/write head 400 with ABS 490, including read sensor 410 and PMR transducer 450. The read sensor 410 may include shields 411 and 413 as well as sensor 412. PMR transducer 450 shown in FIG. 4 includes shield 414, main pole 401, assist pole 401', coils 440 and 440', and trailing shield 420. Main pole 401 has trailing bevel 401a. PMR transducer 450 may also include underlayer or optional leading shield 415, nonmagnetic layer 416, first gap layer 405, and second gap layer 407. Second gap layer 407 has edge 408. A portion of the write coils 440 and 440' is embedded in a coil insulator directly on the second gap layer 407 as shown in FIG. 4. Other and/or different components may be fabricated in other embodiments. For example, optional leading shield 303 shown in FIGS. 3 and 415 in FIG. 4 may be included. In addition, main pole 401 is shown including optional leading edge bevel 401b. However, in some embodiments, the bevel 401b may be omitted. In some embodiments, coupling layers, stop layers and/or seed layers may also remain between layers as part of the fabrication process.

Figure 5:
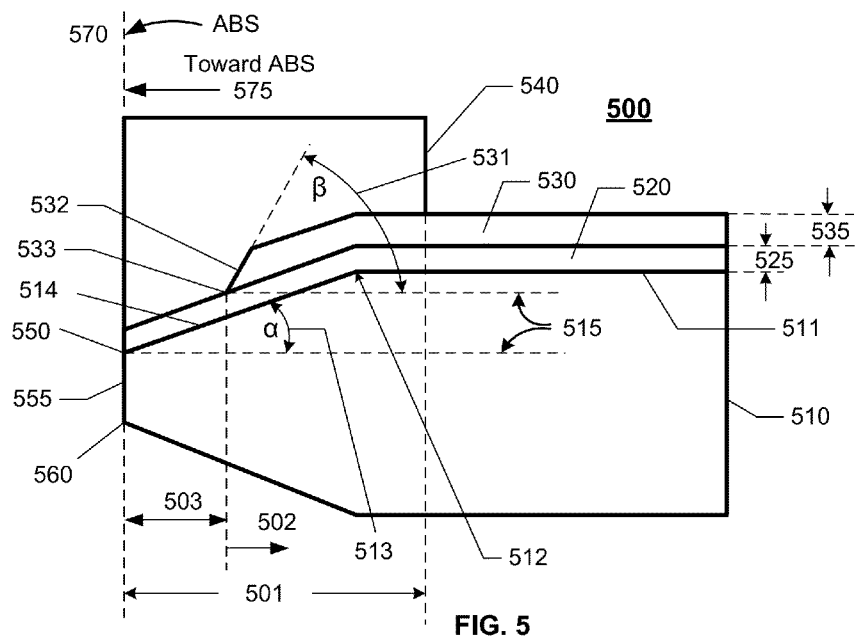
FIG. 5 illustrates an embodiment of the invention with a bevel pole.

FIG. 5 illustrates an embodiment of the invention in write transducer 500 with writer pole 510. Writer pole 510 has pole tip 555 with trailing edge 550 and leading edge 560. The trailing side of write pole 510 has a non beveled surface 511 and first beveled section 514. The first beveled section 514 begins at first vertex 512 at first bevel angle α 513 when measured from the angle 515 that is perpendicular to ABS 570. References toward the ABS are shown by arrow 575, and directions away from the ABS are in the opposite direction. Writer pole 510 may comprise any suitable material, for example, FeCo, FeNi, CoFeNi, or alloys of FeCo.

First gap layer 520 is on and in contact with the trailing side of writer pole 510. Second gap layer 530 is on and in contact with first gap layer 520 on a first section 502 of first gap layer 520 that ends at second gap layer end 533. Second gap layer 530 is absent from a second section 503 of first gap layer 520. In some embodiments, the thickness of first gap layer is 520 is approximately 15-50 nm.

First gap layer 520 and second gap layer 530 may comprise Al2O3, SiO2, NiCr, NiNb, Ru, Cr, Ta, or other nonmagnetic materials.

Second gap layer 530 has edge 532 at second bevel angle β measured from an angle 515 perpendicular to the ABS 570.

First gap layer 520 has first gap layer thickness 525; and second gap layer 530 has second gap layer thickness 535. In some embodiments, thickness 535 of the second gap layer 530 may be approximately 15-200 nm.

In embodiments of the invention, first gap layer 520 and second gap layer 530 may comprise different material that can be selectively etched.

In further embodiments of the invention, first gap layer 520 and second gap layer 530 may comprise Al2O3, SiO2, NiCr, NiNb, Ru, Cr, or Ta.

Trailing shield 540 is on and in contact with the second section of first gap layer 503 and at least a portion of the second gap layer 530. The portion of the second gap layer 530 includes a top surface that is substantially perpendicular to the ABS 570. Trailing shield 540 extends from ABS 570 to a total throat height 501. The thickness of the trailing shield 640 is the total throat height 501 and in some embodiments may be approximately 150-500 nm.

Trailing shield 540 on top of the second section 503 of first gap layer 520 changes the effective throat height of pole tip 555 to be reduced from the total throat height 501 to an effective throat height that is the distance from the ABS 570 to the second gap layer end 533. The effective throat height is therefore the length of second section 503 of the first gap layer 520. The second section 503 of the second first gap layer 520 may be approximately 20-150 nm.

Trailing shield 540 may comprise any suitable material, for example, FeCo, FeNi, CoFeNi, or alloys of FeCo.

Reducing the effective throat height has the effect of improving the magnetic write field produced by write transducer 500 and improving the effectiveness of trailing shield 540 by allowing greater thickness of the trailing shield 540 in the direction perpendicular to the ABS 570.

In some embodiments of the invention, first bevel angle α 513 may be between 0 and 45 degrees, second bevel angle β 531 may be between 30 and 90 degrees, and first bevel angle α 513 is less than second bevel angle β 531.

Figure 6:
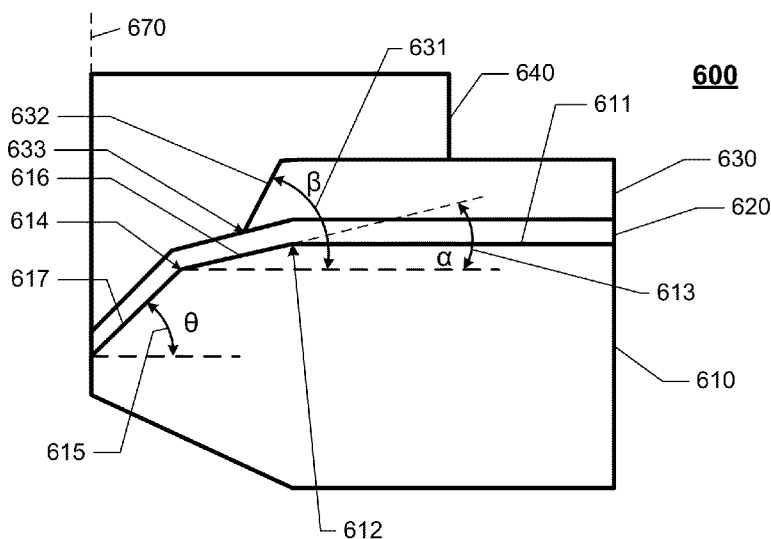
FIG. 6 illustrates and embodiment of the invention with pole with a second bevel section with greater bevel angle.

FIG. 6 illustrates an embodiment of the invention in a write transducer 600 with writer pole 610. Writer pole 610 has two bevels on the trailing side. The trailing side of writer pole 610 has a non beveled surface 611 and first beveled section 616. The first beveled section 616 begins at first vertex 612 at first bevel angle α 613 as measured from the angle perpendicular to ABS 670. Second beveled section 617 begins at second vertex 614 and extends to the ABS 670 at third bevel angle θ 615.

First gap layer 620 is on and in contact with the trailing side of writer pole 610. Second gap layer 630 is on and in contact with first gap layer 620 on a first section of first gap layer that ends at second gap layer end 633. Second gap layer 630 is absent from a second section of first gap layer 620 from the second gap layer end 633 to the ABS 670.

Second gap layer 630 has edge 632 at second bevel angle β 631 measured from an angle perpendicular to ABS 670. In an embodiment, third bevel angle θ 615 is greater than first angle α 613.

In some embodiments of the invention, first bevel angle α 613 may be between 0 and 45 degrees, second bevel angle β may be between 30 and 90 degrees, and first bevel angle α 613 is less than second bevel angle β 631. In a further embodiment, third bevel angle θ 615 may be greater than second bevel angle 631.

Trailing shield 640 is on and in contact with the first beveled section 616 of first gap layer 620 and the second beveled section 617 of first gap layer 620 from ABS 670 to second gap layer end 633; and on and in contact with second gap layer 630.

Figure 7:
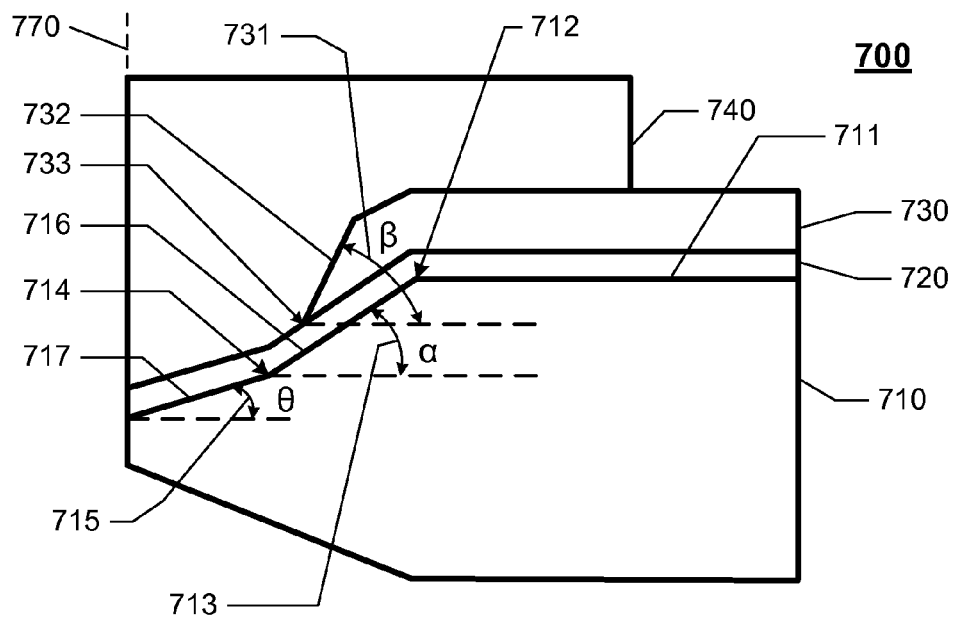
FIG. 7 illustrates an embodiment of the invention with pole with a second bevel section with a smaller bevel angle.

FIG. 7 illustrates an embodiment of the invention in a write transducer 700 with writer pole 710. Writer pole 710 has two bevels on the trailing side. The trailing side of writer pole 710 has a non beveled section 711 and first beveled section 716. The first beveled section 716 begins at first vertex 712 at first bevel angle α 713 as measured from the angle perpendicular to ABS 770. Second beveled section 717 begins at second vertex 714 and extends to the ABS 770 at third bevel angle θ 715. In an embodiment, angle θ 715 is less than first bevel angle α 713.

Second gap layer 730 has edge 732 at second bevel angle β 731 measured from an angle perpendicular to ABS 770.

Trailing shield 740 is on and in contact with first gap layer 720 from ABS 770 to second gap layer end 733, and on and in contact with second gap layer 730.

Figure 8:
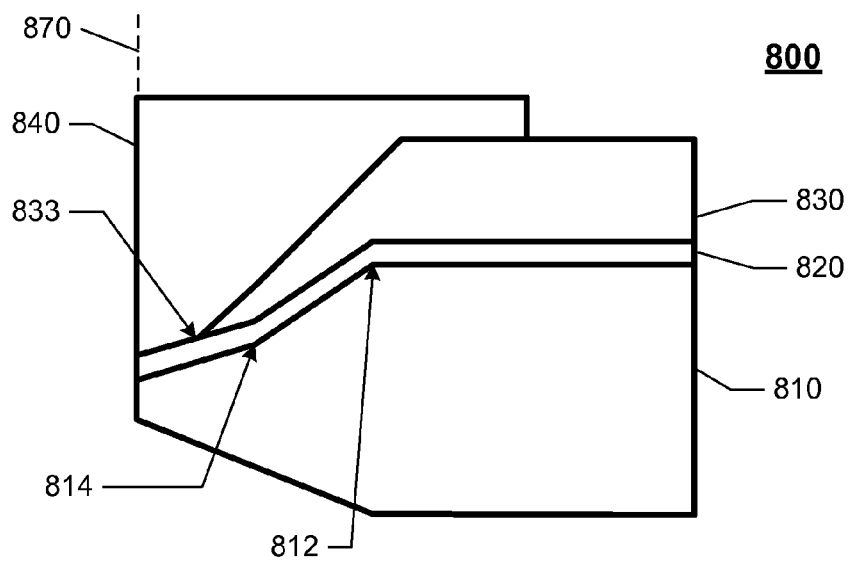
FIG. 8 illustrates and embodiment of the invention with second bevel and second gap layer on a portion of the second bevel.

FIG. 8 illustrates an embodiment of the invention in write transducer 800 with writer pole 810. Writer pole 810 has two bevels on the trailing side. The first bevel begins at first vertex 812, and extends towards ABS 870, ending a second vertex 814. The second bevel begins at second vertex 814 and extends to ABS 870.

First gap layer 820 is on and in contact with writer pole 810, and second gap layer is on and in contact with first gap layer 820 ending at second gap layer end 833. Second gap layer end 833 may be at any point on the bevel between second vertex 814 and ABS 870. Trailing shield 840 is on and in contact with first gap layer 820 from ABS 870 to second gap layer end 833, and on and in contact with second gap layer 830.

Figure 9:
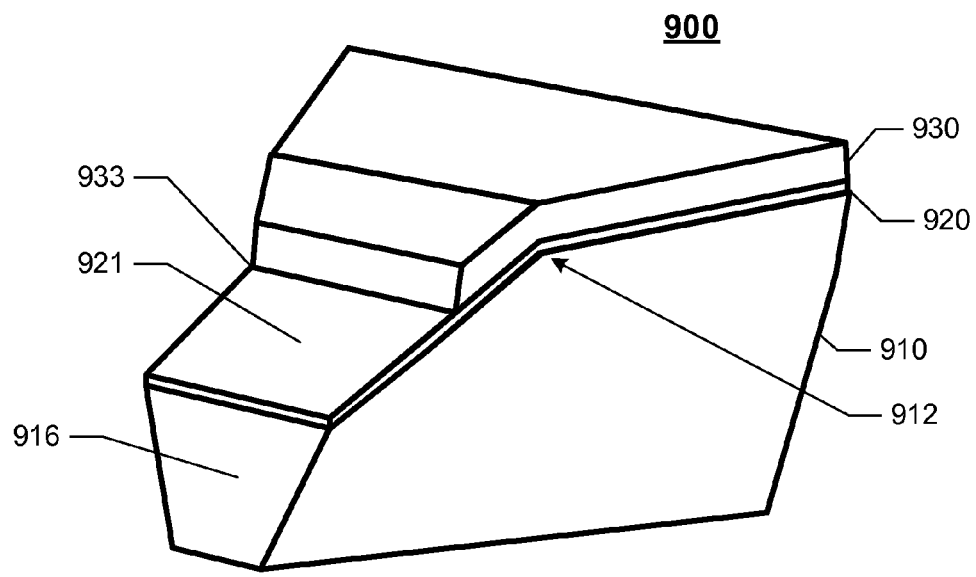
FIG. 9 illustrates a view of an embodiment of the invention with a single bevel.

FIG. 9 illustrates an embodiment of the invention with write transducer 900, writer pole 910, first gap layer 920, and second gap layer 930 in a three dimensional view. A first trailing side bevel begins at first vertex 912 and extends toward pole tip 916. Second gap layer 930 is on and in contact with first gap layer 920, and ending at second gap layer end 933. Second gap layer 930 is absent from the portion 921 of first gap layer 920 between second gap layer end 933 and pole tip 916.

Figure 10:
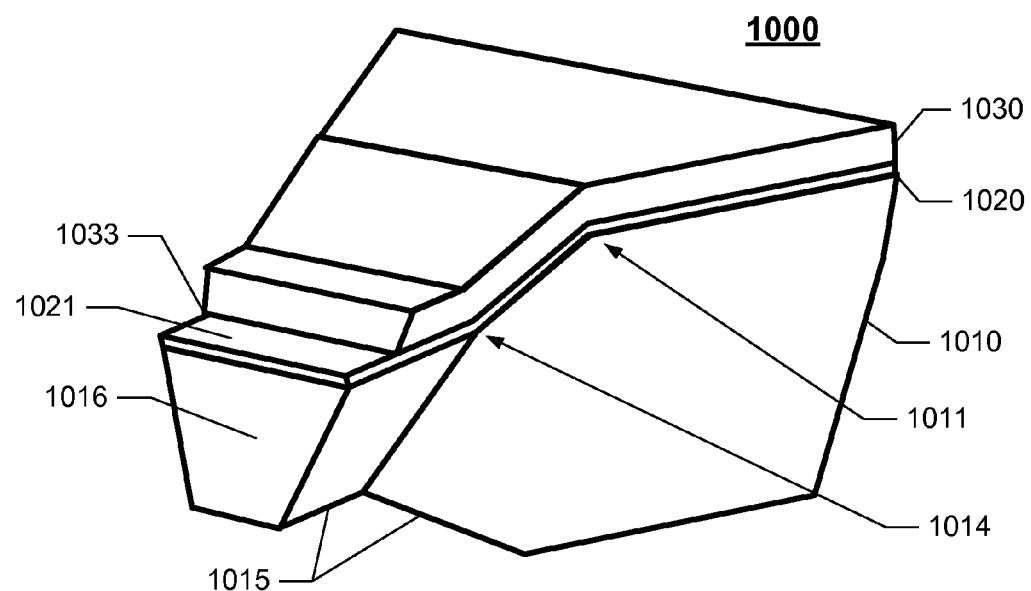
FIG. 10 illustrates a view of an embodiment of the invention with a second bevel

FIG. 10 illustrates an embodiment of the invention with write transducer 1000 and writer pole 1010, first gap layer 1020, second gap layer 1030, and optional leading side bevel 1015 in a three dimensional view. A first trailing side bevel begins at first vertex 1011 and extends to second vertex 1014. Second trailing edge bevel begins at second vertex 1014 and extends to pole tip 1016. Second gap layer 1030 is on and in contact with first gap layer 1020, ending at second gap layer end 1033. Second gap layer 1030 is absent from a portion 1021 of second bevel between second gap layer end 1033 and pole tip 1016.

Figure 11:
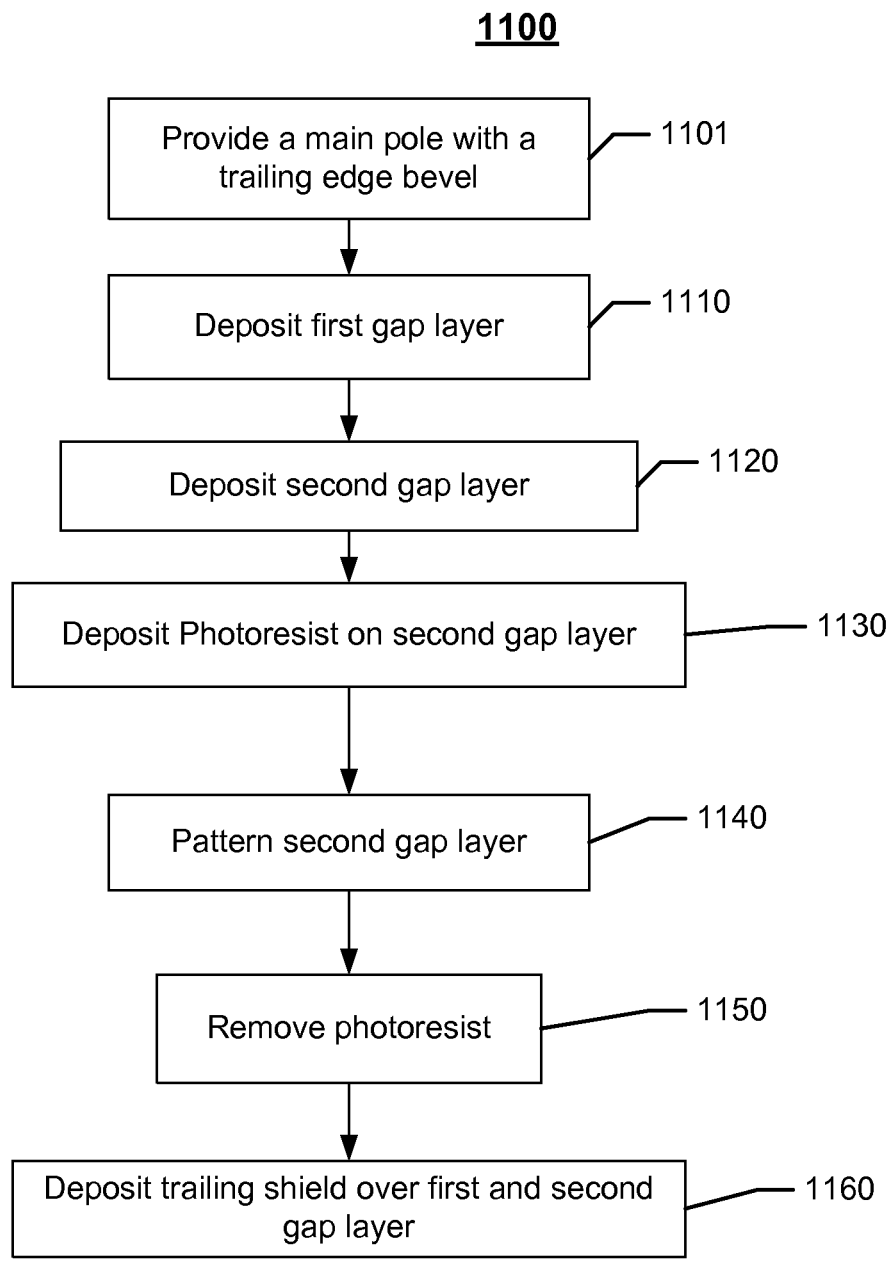
FIG. 11 is a flow chart showing a fabrication process in an embodiment of the invention.

FIG. 11 illustrates process 1100 for fabrication of a writer pole with shortened throat height in an embodiment of the invention.

Beginning in block 1101, a writer pole with a beveled trailing side is provided. Methods for fabricating writer poles and for beveling surfaces are widely documented. In block 1110, a first gap layer is deposited over the main pole trailing edge. In block 1120, a second gap layer is deposited on top of and in contact with the first gap layer. In block 1130, a photoresist or mask is deposited on top of the second gap layer. Any suitable mask process may be used, and may include additional conventional steps such as anti-reflective coatings or thermal processes. In block 1140 the second gap layer is patterned by etching or developing the photoresist to expose a portion of the first gap layer, and in block 1150, the photoresist is removed. In block 1160, a trailing shield is deposited over the first and second gap layers.

Figure 12A:
FIG. 12a-f illustrates fabrication process steps in an embodiment of the invention.
Figure 12B:
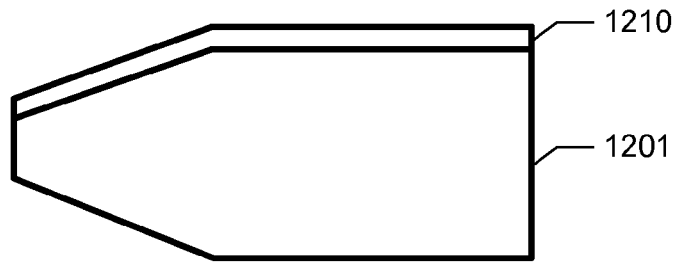
Figure 12C:
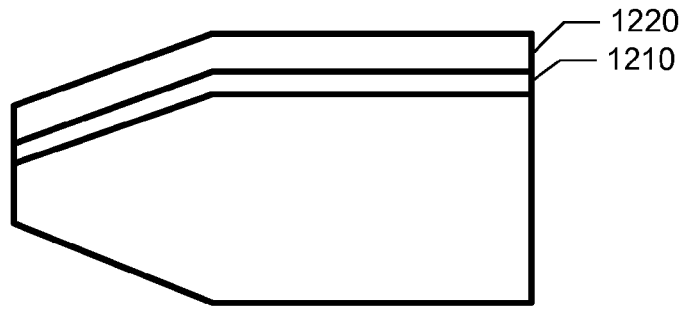
Figure 12D:
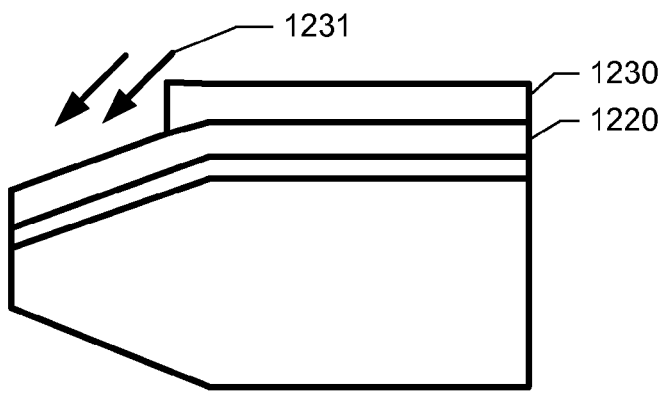
Figure 12E:
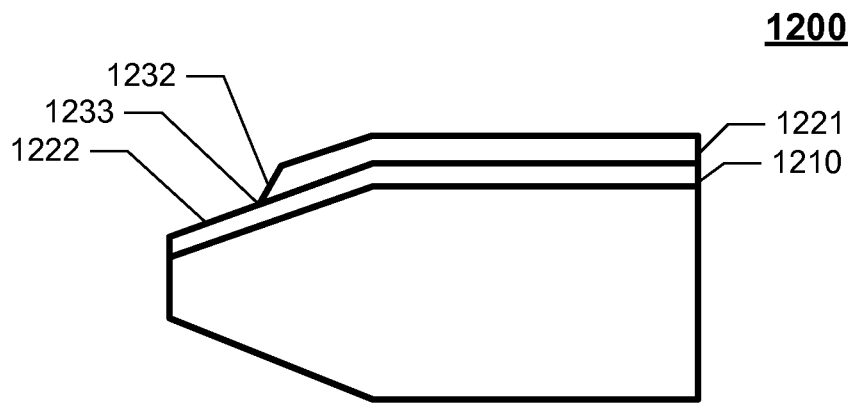
Figure 12F:
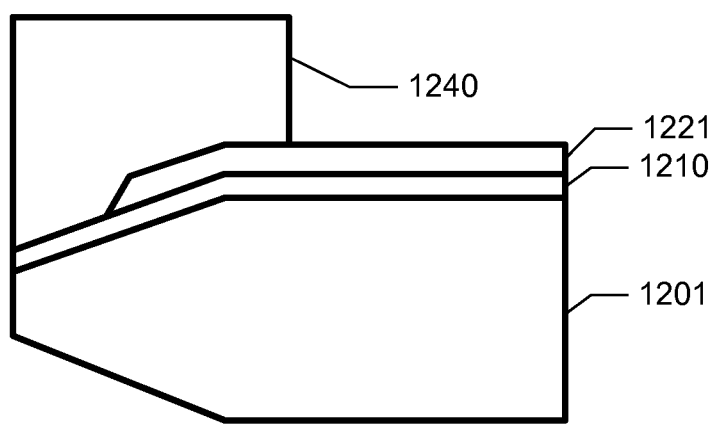

FIGS. 12a-f illustrates process 1200 for fabrication of a writer pole described in process 1100. Beginning in FIG. 12a, a writer pole 1201 with a beveled trailing side is provided. In FIG. 12b, a first gap layer 1210 is deposited over the main pole trailing edge. In FIG. 12c, a second gap layer 1220 is deposited on top of and in contact with the first gap layer 1210. In FIG. 12d, a photoresist or mask 1230 is patterned on top of a portion of second gap layer 1220, leaving an unmasked portion on second gap layer 1220. Angle incident milling or dry etching 1231 is applied to etch the unmasked portion of second gap layer 1220. Angle incident milling may be ion beam milling and dry etching may be reactive ion etch. In FIG. 12e, photoresist is removed, providing second gap layer 1221, angled edge 1232, second gap layer end 1233, and exposed section 1222 of first gap layer 1210. In FIG. 12f, trailing shield 1240 is deposited on top of first gap layer 1210 and second gap layer 1221, providing writer pole 1201 with a trailing shield 1240 having a shortened throat height.

Although the foregoing has been described in terms of certain embodiments, other embodiments will be apparent to those of ordinary skill in the art from the disclosure herein. Figures are illustrative and not drawn to scale. For example, non beveled surfaces may be slightly tilted and beveled surfaces may be slightly irregular; main pole surfaces may have slight curvature, concave, or convex; and beveled surfaces may have more than two vertices without departing from the spirit of the invention. Write pole tip, shields, and gap layers may be recessed from the ABS in some embodiments. Shields and poles shown as solids may have gradients, or have ferromagnetic or antiferromagnetic coupling layers. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

We claim:

1. A magnetic recording transducer for use in a data storage device, comprising:
    a writer pole with a trailing side and a leading side opposite the trailing side, the trailing side comprising:
        a non-beveled surface beginning at a first vertex, the non-beveled surface extending in a direction away from an Air Bearing Surface (ABS);
        a first trailing side beveled section beginning at the first vertex and extending from the first vertex in a direction toward the ABS;
        the first trailing side beveled section beveled at a first bevel angle ($\alpha$) from a direction perpendicular to the ABS;
    the leading side comprising a leading side beveled section;
    a first gap layer on and in contact with the non-beveled surface and the first trailing side beveled section;
    a second gap layer on a first section of the first gap layer and absent from a second section of the first gap layer, wherein the second section of the first gap layer on the first trailing side beveled section is nearer to the ABS than the first section,
    wherein the second gap layer has a thickness forming an edge, the edge forming a second bevel angle ($\beta$) from the direction perpendicular to the ABS, and $\beta$ is less than 90 degrees;
    a write coil;
    a coil insulator on the second gap layer, wherein a portion of the write coil is embedded in the coil insulator; and
    a trailing shield on at least a portion of the first gap layer and on at least a portion of the second gap layer, wherein the portion of the second gap layer comprises a surface that is substantially perpendicular to the ABS.

2. The magnetic recording transducer in claim 1, wherein the trailing shield is on at least a portion of the non-beveled surface.

3. The magnetic recording transducer in claim 1, wherein $\alpha$ is between 0 and 45 degrees.

4. The magnetic recording transducer of claim 1, wherein an effective throat height of the magnetic recording transducer is about equal to a distance between the edge of the second gap layer and the ABS.

5. The magnetic recording transducer in claim 1, wherein $\beta$ is greater than 30.

6. The magnetic recording transducer in claim 1, wherein $\alpha$ is less than $\beta$.

7. The magnetic recording transducer in claim 1, wherein the distance from the ABS to the second gap layer is 20-150 nm.

8. The magnetic recording transducer in claim 1, wherein the thickness of the trailing shield is 150-500 nm.

9. The magnetic recording transducer in claim 1, wherein the thickness of the first gap layer is 15-50 nm.

10. The magnetic recording transducer in claim 1, wherein the thickness of the second gap layer is 15-200 nm.

11. The magnetic recording transducer of claim 1, wherein the first gap layer comprises non-magnetic material.

12. The magnetic recording transducer in claim 1, wherein the first gap layer and second gap layer comprise Al2O3, SiO2, NiCr, NiNb, Ru, Cr, or Ta.

13. The magnetic recording transducer in claim 12, wherein the first gap layer and second gap layer comprise different materials that can be selectively etched.

14. A disk drive comprising:
a slider including a magnetic recording transducer, the magnetic recording transducer including:
- a writer pole with a trailing side and a leading side opposite the trailing side, the trailing side comprising:
  - a non-beveled surface beginning at a first vertex, the non-beveled surface extending in a direction away from an Air Bearing Surface (ABS);
  - a first trailing side beveled section beginning at the first vertex and extending from the first vertex in a direction toward the ABS;
  - the first trailing side beveled section beveled at a first bevel angle ($\alpha$) from a direction perpendicular to the ABS;
- the leading side comprising a leading side beveled section;
- a first gap layer on and in contact with the non-beveled surface and the first trailing side beveled section;
- a second gap layer on a first section of the first gap layer and absent from a second section of the first gap layer, wherein the second gap layer has a thickness forming an edge, the edge forming a second bevel angle ($\beta$) from the direction perpendicular to the ABS, and $\beta$ is less than 90 degrees, wherein:
  - the second section of the first gap layer on the first trailing side beveled section is nearest the ABS;
- a write coil;
- a coil insulator on the second gap layer, wherein a portion of the write coil is embedded in the coil insulator; and
- a trailing shield on at least a portion of the first gap layer and on at least a portion of the second gap layer, wherein the portion of the second gap layer comprises a surface that is substantially perpendicular to the ABS.

* * * * *